United States Patent
Zhao et al.

(10) Patent No.: US 7,918,612 B1
(45) Date of Patent: Apr. 5, 2011

(54) METHOD AND APPARATUS FOR MECHANICALLY SPLICING OPTIC FIBERS

(75) Inventors: Jing Zhao, Winchester, MA (US);
Yongjun Wu, Andover, MA (US);
Yuanxin Shou, Wellesley, MA (US);
Qingdong Guo, Nashua, NH (US)

(73) Assignee: Agiltron, Inc., Woburn, MA (US)

( * ) Notice: Subject to any disclaimer, the term of this patent is extended or adjusted under 35 U.S.C. 154(b) by 228 days.

(21) Appl. No.: 12/004,880

(22) Filed: Dec. 24, 2007

Related U.S. Application Data

(60) Provisional application No. 60/924,692, filed on May 29, 2007.

(51) Int. Cl.
*G02B 6/255* (2006.01)
(52) U.S. Cl. ............................. 385/99; 385/95
(58) Field of Classification Search ................. None
See application file for complete search history.

(56) References Cited

U.S. PATENT DOCUMENTS

| | | | |
|---|---|---|---|
| 4,057,448 A * | 11/1977 | Miller | 156/158 |
| 4,506,946 A * | 3/1985 | Hodge | 385/70 |
| 4,647,150 A * | 3/1987 | DeSanti et al. | 385/98 |
| 4,717,233 A * | 1/1988 | Szkaradnik | 385/98 |
| 4,763,970 A * | 8/1988 | Berkey | 385/72 |
| 4,919,510 A * | 4/1990 | Hoke et al. | 385/95 |
| 5,018,821 A * | 5/1991 | Kurata | 385/72 |
| 5,061,034 A * | 10/1991 | Fujikawa et al. | 385/95 |
| 5,085,494 A * | 2/1992 | Wesson et al. | 385/98 |
| 5,113,464 A | 5/1992 | Wall | |
| 5,469,522 A * | 11/1995 | Fan | 385/98 |
| 5,568,585 A | 10/1996 | Kramer | |
| 5,664,043 A | 9/1997 | Donaldson | |
| 5,815,619 A | 9/1998 | Bloom | |
| 6,088,504 A | 7/2000 | Filas et al. | |
| 6,220,766 B1 | 4/2001 | Yeandle et al. | |
| 6,351,593 B1 | 2/2002 | Pollack et al. | |
| 6,901,203 B1 | 5/2005 | Czubarow et al. | |
| 6,959,140 B2 | 10/2005 | Cens et al. | |
| 7,014,370 B2 | 3/2006 | Chudoba et al. | |
| 7,103,257 B2 | 9/2006 | Donaldson et al. | |
| 7,198,416 B2 | 4/2007 | Ray et al. | |
| 7,209,375 B2 | 4/2007 | Gimbel et al. | |
| 7,210,857 B2 | 5/2007 | Blasingame et al. | |
| 7,306,382 B2 * | 12/2007 | Qian et al. | 385/95 |

* cited by examiner

*Primary Examiner* — Mike Stahl
(74) *Attorney, Agent, or Firm* — Burns & Levinson LLP; Orlando Lopez

(57) ABSTRACT

A method and apparatus for mechanically splicing a pair of optic fibers or optic cables, the mechanical splice comprising: a ferrule having an axial capillary bore, the capillary bore configured to enclose the optic fibers at both ends of the ferrule; and cured epoxy disposed to secure together the ends of the optic fibers and to secure the optic fibers to an inside surface of the capillary bore, the ferrule optionally enclosed in a metal tube.

3 Claims, 6 Drawing Sheets

METHOD AND APPARATUS FOR MECHANICALLY SPLICING OPTIC FIBERS

CROSS-REFERENCE TO RELATED APPLICATION

The present application claims the benefit of Provisional Patent Application No. 60/924,692 entitled "Compact and curable work station for fiber splice," filed 29 May 2007 and incorporated by reference herein in its entirety.

The U.S. Government has a paid-up license in this invention and the right in limited circumstances to require the patent owner to license others on reasonable terms as provided for by the terms of Contract No. N68335-05-C-0308 awarded by the U.S. Department of the Navy.

BACKGROUND OF THE INVENTION

1. Field of Invention

The present invention relates to optic fiber splicing and, in particular, to a method and apparatus for mechanically splicing optic fibers.

2. Description of the Background Art

Fusion splicing of optic fiber has been utilized in connecting optic fibers for a wide variety of optic devices, and has also been used for the installation of fiber spans for telecommunications networks. In most such application, the fusion splicing process is preferred over other methods to achieve minimum insertion loss and long term reliability. However, for some applications a mechanical splicing process may present a low-cost and convenient alternative that can accommodate many types of optic fibers. In particular, the mechanical splicing alternative is often the preferred choice for applications in which the work environment presents a fire or explosive hazards, such as in an aircraft, around oil stations, and in mines. In such hazardous applications, the use of a high-voltage fusion splicing device is typically prohibited for safety reasons.

Optic fiber mechanical splicing devices are known in the prior art. Conventional mechanical splicers are typically based on a V-groove seating configuration and, accordingly, are typically used only for temporary fiberoptic connections because of associated unproven long term reliability concerns. With respect to these reliability concerns, two primary long-term failure mechanisms have been identified in optic fiber components: material deterioration caused by prolonged humidity exposure and joint fatigue caused by extended thermal cycling induced stress as well as relative movement between subcomponents. These two failure mechanisms need to be addressed in the industry if the fundamental design objectives are to realize a twenty-five year component operation life and high reliability fiberoptic components.

The process of optic fiber splicing typically includes several manual steps and involves extensive fiber handling among multiple pieces of processing equipment. The fiber splicing preparation may include: fiber stripping, fiber tip cleaning, fiber cleaving, fiber aligning, fiber securing and fiber splice packaging. Each of these process steps requires manual loading, unloading, and other manual process steps. The manipulation and handling of the fibers throughout these process steps compromises fiber strength and may lead to failure during subsequent use.

What is needed is a method and apparatus using an integral precision fiber alignment feature to easily and quickly produce a permanent mechanical splice for optic fibers.

SUMMARY OF THE INVENTION

In one aspect of the present invention, device for mechanically splicing a first optic fiber to a second optic fiber comprises: a ferrule having an axial capillary bore, the capillary bore configured to enclose the first optic fiber at a first end of the ferrule and to enclose the second optic fiber at a second end of the ferrule; and cured epoxy disposed to secure an end of the first optic fiber to an end of the second optic fiber, the cured epoxy further disposed to secure the first optic fiber and the second optic fiber to an inside surface of the capillary bore.

In another aspect of the present invention, an apparatus for splicing a first optic fiber to a second optic fiber comprises: a first clamp secured to the first optic fiber; a second clamp secured to the second optic fiber, the first and second clamps for retaining an end of the first optic fiber against an end of the second optic fiber; and an ultraviolet light source disposed to irradiate epoxy disposed between the end of the first optic fiber and the end of the second optic fiber.

In another aspect of the present invention, a method for splicing optic fibers comprises the steps of: providing epoxy in a capillary bore of a ferrule; placing an end of a first optic fiber against an end of a second optic fiber in the epoxy inside the capillary bore; and curing the epoxy.

The additional features and advantage of the disclosed invention is set forth in the detailed description which follows, and will be apparent to those skilled in the art from the description or recognized by practicing the invention as described, together with the claims and appended drawings.

DETAILED DESCRIPTION OF THE INVENTION

The following detailed description is of the best currently contemplated modes of carrying out the invention. The description is not to be taken in a limiting sense, but is made merely for the purpose of illustrating the general principles of the invention, since the scope of the invention is best defined by the appended claims.

The present invention is a method and apparatus for efficiently producing a permanent, high reliability mechanism splice for optic fiber applications. The disclosed mechanical splice design has been shown to successfully pass standard industry environmental tests, including vibration and thermal shock, to qualify for permanent installation application. Moreover, the disclosed design uses a glass seal technology to permanently encapsulate components in a ferrule. For more demanding environmental conditions, or for application to fiber cable designs, a metal tube may be positioned and crimped to enclose the ferrule to withstand tensile forces in the optic fiber cable.

This feature provides high reliability even when humidity is a concern, for example, as exemplified by having successfully passed high pressure autoclave humidity testing of 120° C. and 100% relative humidity for a one week cycle. In addition, the disclosed mechanical splice design uses glass material with a coefficient of thermal expansion matched to the optic fibers to mitigate or eliminate the progressive damage caused by thermal cycling, and to provide temperature stability performance.

The disclosed ferrule design provides passive precision self-alignment for an inserted optic fiber core and guided fiber insertion. The ferrule comprises a material substantially transparent to ultraviolet radiation to allow for an integrated ultraviolet epoxy curing capability. One design feature of the disclosed fiber guide ferrule allows for the insertion of polyimide-coated fiber directly without the need to first strip the hard resin buffer material layer. This approach is versatile and applies to a wide variety of the fibers found in military aviation including both multi-mode and single-mode fibers. The ferrule includes a non-circular capillary bore forming one or more axial micro channels when the optic fibers are inserted. The micro channels allow an outflow of excess epoxy and air bubbles when two optic fibers are inserted into the epoxy contained in the ferrule. By using refractive index matching of the epoxy and ferrule, and by applying an axial load to minimize the space between the ends of the two optic fibers, an extremely low optic loss can be achieved between the fibers, to as little as 0.05 dB or less.

Figure 1:
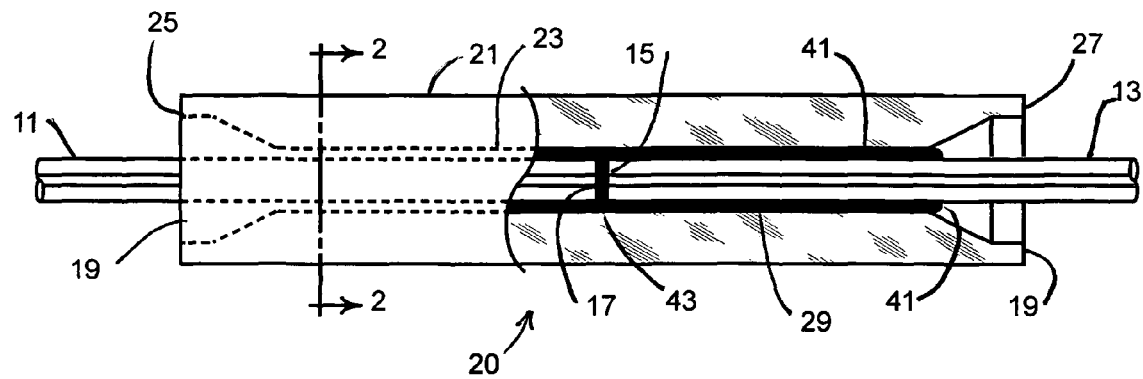
FIG. 1 is a diagrammatical illustration of two optic fibers secured within a ferrule to form a mechanical splice shown in partial cross section, in accordance with the present invention.
Figure 2:
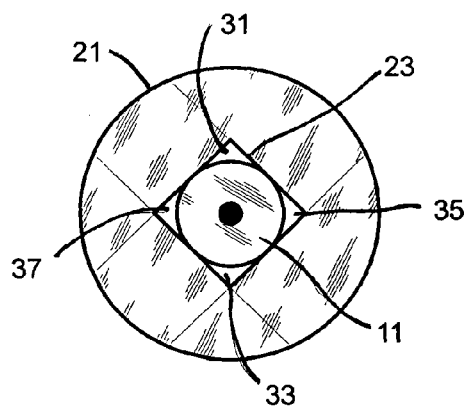
FIG. 2 is a cross-sectional diagrammatical illustration of the mechanical splice of FIG. 1 showing a square capillary bore with four micro channels in the ferrule.

There is shown in FIGS. 1 and 2 an exemplary embodiment of a mechanical splice 20, in accordance with the present invention. The mechanical splice 20 functions to connect a first optic fiber 11 to a second optic fiber 13 by providing a permanent splice with a low fiber insertion loss. The mechanical splice 20 comprises a ferrule 21 with a capillary bore 23 axially extending between a first ferrule end 25 and a second ferrule end 27. As best seen in FIG. 2, the capillary bore 23 may have a non-circular cross-section in the general shape of a four-sided polygon, such as a trapezoid or square. The capillary bore 23 is configured to allow insertion of the first optic fiber 11 and the second optic fiber 13 into the ferrule 21, as shown.

The specified size of the capillary bore 23 is large enough to allow the first optic fiber 11 and the second optic fiber 13 to be inserted into and guided through the opposite ferrule ends 25 and 27 without breakage or binding. The size of the capillary bore 23 is further small enough to provide for close retention of the optic fibers 11 and 13 inside the capillary bore 23 and thus provide for precise relative alignment of the respective fiber cores when an end face 15 of the first optic fiber 11 makes contact with an end face 17 of the second optic fiber 13. In the example provided, the capillary bore 23 is shaped such that the optic fibers 11 and 13 contact the perimeter of the capillary bore 23 at up to four circumferential regions and are thus restrained from misalignment. The ferrule 21 may include lead-in funnel-like or concave conical openings 19 at the ferrule ends 25 and 27, to provide improved fiber guidance when the optic fibers 11 and 13 are being inserted into the ferrule 21.

The above configuration of the capillary bore 23 further provides micro channels 31, 33, 35, and 37 as internal volumes for retaining an epoxy 41. As explained in greater detail below, the micro channels 31, 33, 35, and 37 also function as conduits to allow or enable excess epoxy 41 to flow out of the ferrule 21 as the optic fibers 11 and 13 are being inserted into the ferrule 21. A thin layer 43 of the epoxy 41 is retained between the end face 15 of the first optic fiber 11 and the end face 17 of the second optic fiber 13 after the optic fibers 11 and 13 have been inserted into the ferrule 21. The thin layer 43 of the epoxy 41 thus functions to mechanically secure the end face 15 of the optic fiber 11 to the end face 17 of the optic fiber 13. The epoxy 41 remaining in the micro channels 31, 33, 35, and 37 function to secure the outer surface of the first optic fiber 11 and the outer surface of the second optic fiber 13 to the ferrule 21.

In an exemplary embodiment, the index of refraction of the epoxy 41 is substantially the same as, or closely matched to, the index of refraction of the cores of the optic fibers 11 and 13 to assure minimal insertion loss of signal at the interface between the end face 15 and the end face 17. The insertion loss may be further minimized by maintaining a close tolerance on the size of the capillary bore 23 so as to provide precise alignment of the respective fiber optic cores. Preferably, the thermal coefficient of expansion of the epoxy 41 is closely matched to the thermal coefficients of expansion of the optic fibers 11 and 13, and the thermal coefficient of expansion of the material used for the ferrule 21 is also closely matched to the thermal coefficient of expansion of the optic fibers 11 and 13. This thermal coefficient matching serves to minimize thermal stresses in the mechanical splice 20 produced when the ambient temperature varies.

Figure 3:
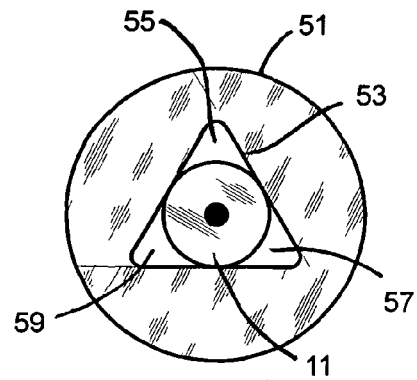
FIG. 3 is a cross-sectional diagrammatical illustration of an alternative embodiment of the mechanical splice of FIG. 1 showing a triangular capillary bore with three micro channels in the ferrule.

In an alternative exemplary embodiment, shown in the cross-sectional diagram of FIG. 3, a ferrule 51 comprises a capillary bore 53 having a non-circular cross sectional shape of a three-sided polygon, or triangle. It should be understood that the shape of the capillary bore 53 need not be an equilateral triangle, and that the vertices of the triangular capillary may be rounded, as shown, in accordance with fabrication preference. The size of the capillary bore 53 is preferably specified such that the first optic fiber 11 and the second optic fiber 13 can make contact with each other inside the ferrule 51 with precise relative alignment of the respective fiber cores, as discussed above for the ferrule 21. That is, the optic fibers 11 and 13 contact the perimeter of the capillary bore 53 at three circumferential regions to insure the proper relative alignment.

The capillary bore 53 is further configured to provide micro channels 55, 57, and 59 as internal volumes for retaining the epoxy 41, where the specific sizes, shapes, and relative positions of the micro channels 55, 57, and 59 depend upon the ferrule design and fabrication processes. The micro channels 55, 57, and 59 similarly serve as conduits to allow or enable excess epoxy 41 to flow out of the ferrule 51 as the optic fibers 11 and 13 are being inserted into the ferrule 51. The epoxy 41 splices the first optic fiber 11 to the second optic fiber 13 in the ferrule 51.

Figure 4:
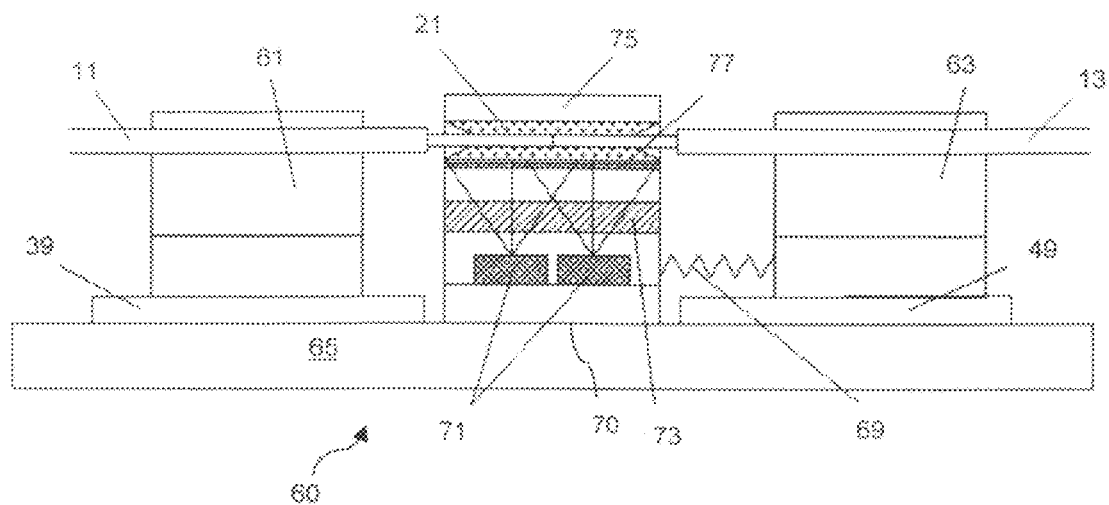
FIG. 4 is a simplified diagram of one embodiment of a workstation having an ultraviolet light module suitable for fabricating the mechanical splice of FIG. 2, in accordance with the present invention.

An exemplary embodiment of a mechanical splicing apparatus 60, or curing station, for producing the mechanical splice 20 is shown in the diagram of FIG. 4. The apparatus 60 comprises a first detachable clamp 61 removably mounted to a guide 39 on a base 65, and a second detachable clamp 63 slidably mounted to a guide 49 on the base 65. An ultraviolet light module 70 is mounted to the base 65 between the first detachable clamp 61 and the second detachable clamp 63. An elastic component, such as a spring 69, is connected to the ultraviolet light module 70 and to the second detachable clamp 63 as shown in the diagram. The ultraviolet light module 70 is configured to retain and irradiate a ferrule in position for insertion of the optic fibers 11 and 13. In an exemplary embodiment, the emplaced ferrule may be the ferrule 21, as shown, the ferrule 51 described above, or either ferrule 111 or ferrule 121 described below.

The first detachable clamp 61 may be used to secure and position the first optic fiber 11, and the second detachable clamp 63 may be used to secure and position the second optic fiber 13, as shown in the diagram. Stripping, cleaning, and cleaving processes may be performed on the optic fibers 11 and 13, if desired, while secured in the respective clamps 61 and 63 before attachment to the base 65. Both the first detachable clamp 61 and the second detachable clamp 63 can be moved along the base such that the first optic fiber 11 and the second optic fiber 13 can be positioned for insertion into the emplaced ferrule 21 while being held in the respective detachable clamps 61 and 63.

When the first detachable clamp 61 is fixed to the guide 39 on the base 65 and the second detachable clamp 63 is allowed to slide along the guide 49, the spring 69 functions to provide a precisely controlled, predetermined force for urging the second detachable clamp 63 toward the fixed first detachable clamp 61, an action which causes the end 17 of the second optic fiber 13 to be controllably and precisely forced against the end 15 of the first optic fiber 11 inside the ferrule 21.

Figure 5:
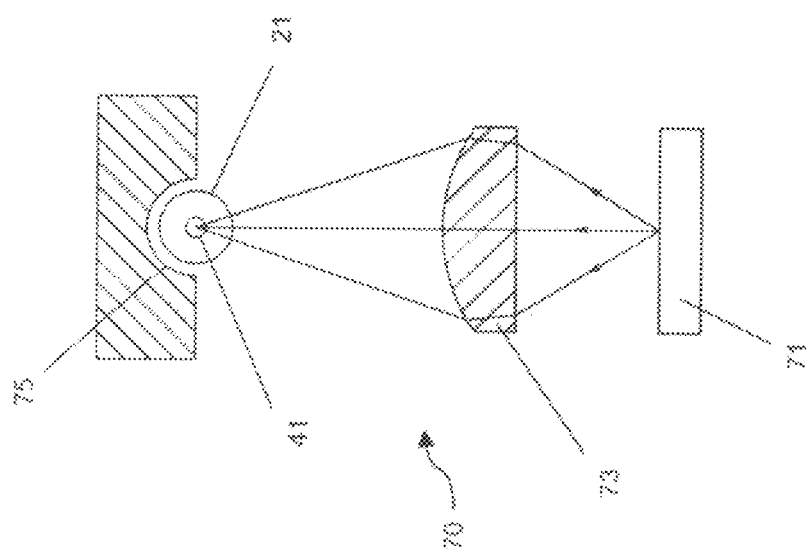
FIG. 5 is a diagrammatical illustration of the ultraviolet light module of FIG. 4 showing a cylindrical lens used to direct ultraviolet light.

The ultraviolet light module 70 comprises an ultraviolet light source, such as one or more UV lasers (not shown) or UV LEDs 71 (as shown). Some of the ultraviolet light from the UV LEDs 71 may be directly focused onto the epoxy 41 in the ferrule by passing the light through a converging cylindrical lens 73, as shown in greater detail in the diagram of FIG. 5. Other ultraviolet light from the UV LEDs 71 may be scattered from a reflector 75 to additionally irradiate other areas of the epoxy 41 upon reflection. The UV LEDs 71 may be disposed proximate a UV-transparent window 77 to allow for positioning of the ferrule 21 proximate the ultraviolet light sources 71.

Figure 6:
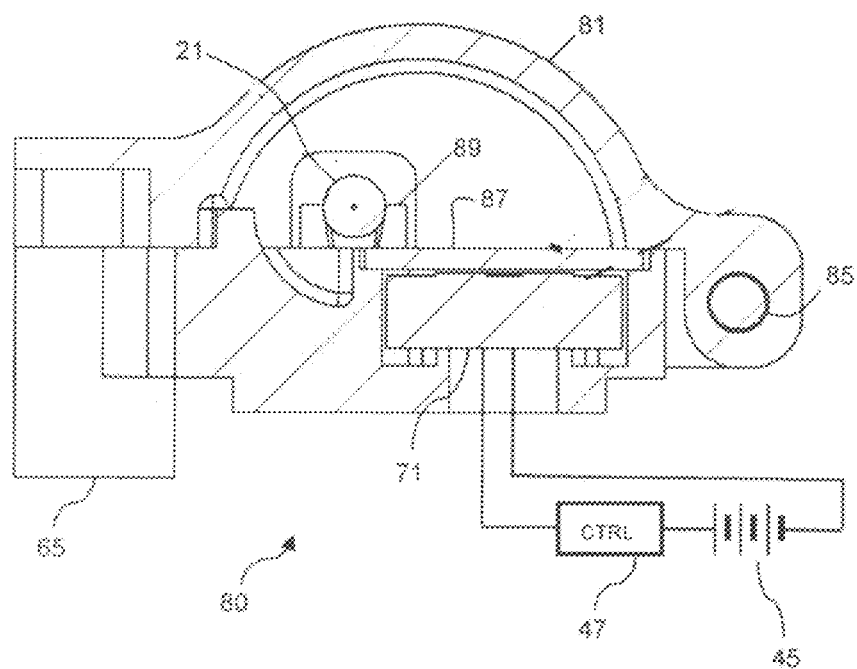
FIG. 6 is a side view of a portion of an alternative embodiment of a UV module for the workstation of FIG. 4.

The ultraviolet light sources in the ultraviolet light module 70 are powered by a power source, such as a rechargeable cell or battery 45 (shown in FIG. 6). Control electronics 47 (shown in FIG. 6) may be provided to control the exposure time and intensity of the UV LEDs 71 or UV diodes (if used). In an exemplary embodiment, a switch (not shown) is provided to allow an operator to apply a pre-set amount of power to the UV LEDs 71 or to the UV laser diodes. The operating intensity of the ultraviolet radiation may also be pre-set in the control electronics 47. It can be appreciated that, by providing UV LEDs as a source of ultraviolet light and a battery as a source of power, the mechanical splicing apparatus 60 may be configured as a compact, portable mechanical splicing device suitable for field applications.

Figure 7:
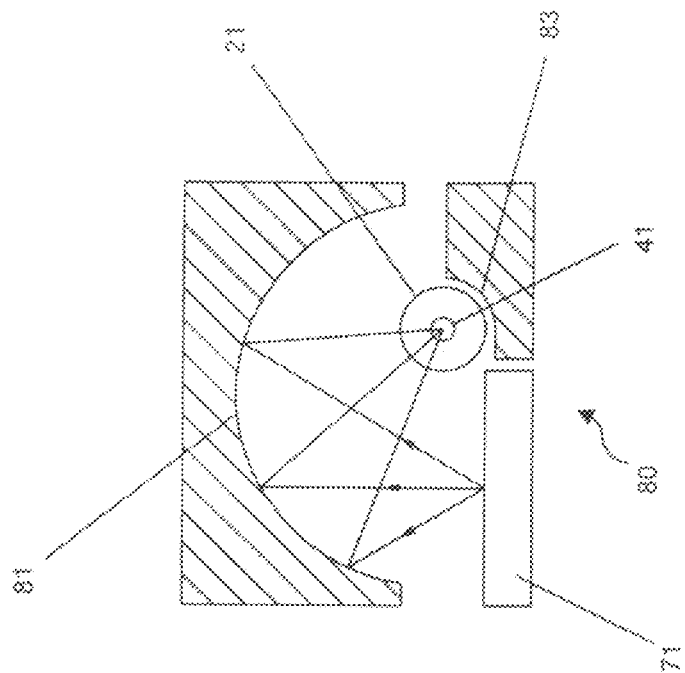
FIG. 7 is a diagrammatical illustration of the ultraviolet light module of FIG. 6 showing a reflector used to direct ultraviolet light.

FIGS. 6 and 7 illustrate an alternate exemplary embodiment of an ultraviolet light module 80 that can be attached to the base 65 in place of the ultraviolet light module 70. A ferrule, such as the ferrule 21, may be secured in the ultraviolet light module 80 by mounting in a V-shaped ferrule clamp 89. Ultraviolet light, provided by the UV LEDs 71, may be reflected from a primary reflector, such as a cylindrical mirror 81, on to the epoxy 41 in the ferrule 21. The cylindrical mirror 81 may be rotatable about a pivot 85 to allow for emplacement and removal of the ferrule 21 from the ultraviolet light module 80. Stray ultraviolet light may be reflected to the epoxy by a secondary reflector 83 disposed proximate the ferrule 21, as best seen in the diagrammatical representation of FIG. 7. The ultraviolet LEDs 71 may be positioned against a UV-transparent glass plate 87 for alignment purposes. Operation of the ultraviolet LEDs 71 may be controlled and powered by the control electronics 47 and the battery 45, as described above.

Figure 8:
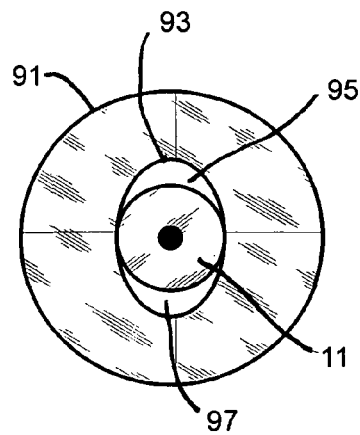
FIG. 8 is a cross-sectional diagrammatical illustration of an alternative embodiment of the mechanical splice of FIG. 1 showing an oval capillary bore with two micro channels in the ferrule.

An alternative exemplary embodiment of a ferrule 91, shown in FIG. 8, may comprise a capillary bore 93 having an oval or elliptical shape. The size of the capillary bore 93 is specified such that each of the first optic fiber 11 and the second optic fiber 13 can make contact at two circumferential regions, as shown, to provide for precise relative alignment of the respective fiber cores, as discussed above. In the configuration shown, a first micro channel 95 and a second micro channel 97 are provided for outflow of excess epoxy 41.

Figure 9:
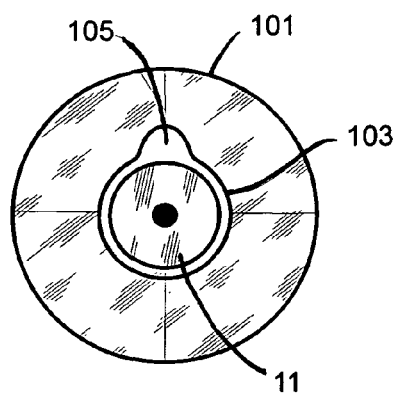
FIG. 9 is a cross-sectional diagrammatical illustration of an alternative embodiment of the mechanical splice of FIG. 1 showing an elongated capillary bore with one micro channel in the ferrule.

In yet another exemplary embodiment, shown in FIG. 9, a ferrule 101 may comprise a capillary bore 103 having an elongated non-circular shape. The capillary bore 103 provides a single micro channel 105 for excess epoxy 41. It should be understood that the inside configuration of the greater portion of the capillary bore 103 closely approximates the geometry of the outside surfaces of the optic fibers 11 and 13. The gap shown between the optic fiber 11 and the capillary bore 103 has accordingly been exaggerated to more clearly illustrate this feature.

Figure 10:
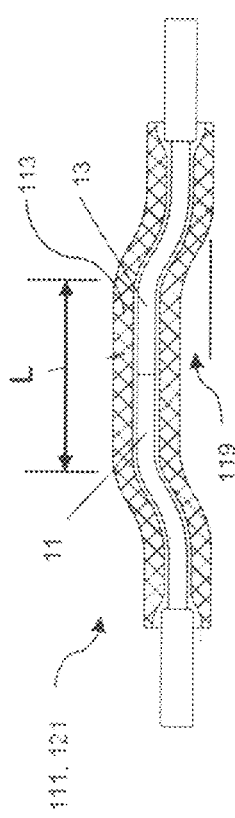
FIG. 10 is a cross-sectional diagrammatical illustration of an alternative embodiment of the mechanical splice of FIG. 1 showing a ferrule with an offset section.

FIG. 10 shows a cross-sectional view of an alternative exemplary embodiment of a ferrule 111 (and a ferrule 121) having an offset section 113 for providing precise fiber optic alignment with capillary bores that have reduced fabrication tolerances. The offset section 113 has an offset length "L" displaced at an offset distance 119, where the offset length L and the offset distance 119 may be determined as a function of optic fiber parameters and epoxy material properties. In an exemplary embodiment, the offset distance 119 may be in the range of 20-30 µm.

Figure 11:
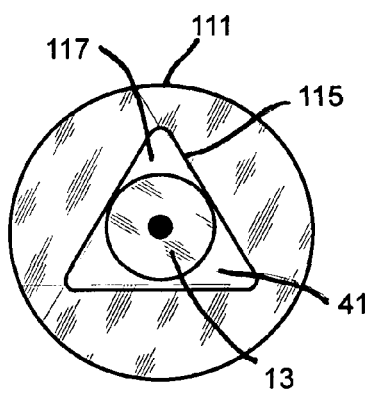
FIG. 11 is a cross-sectional diagrammatical illustration of the mechanical splice of FIG. 10 showing a triangular capillary bore having relaxed fabrication tolerances.
Figure 12:
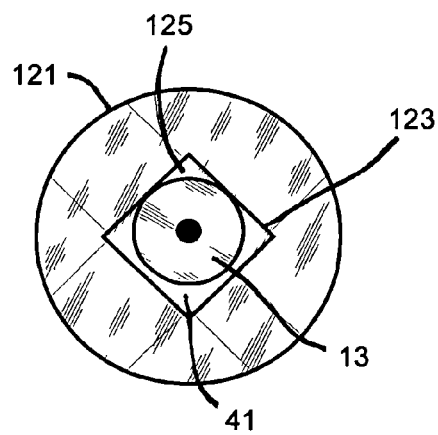
FIG. 12 is a cross-sectional diagrammatical illustration of an alternative embodiment of the mechanical splice of FIG. 10 showing a square capillary having relaxed fabrication tolerances.

FIG. 11 is a cross sectional view of the offset section 113 of the ferrule 111 showing the optic fiber 13 emplaced in a triangular capillary bore 115 having relaxed fabrication tolerances. Accordingly, the optic fiber 13 is forced against a micro channel 117 by virtue of the geometry of the offset section 113. In this configuration, the optic fiber 13 contacts an inside vertex of the triangular bore 115 at two circumferential regions, in the direction of the offset section 113. It can be appreciated that the space between the optic fiber 13 and the inside surface of the triangular capillary bore 115 contains the epoxy 41. Likewise, FIG. 12 shows a cross sectional view of an offset ferrule 121 having a square capillary bore 123 with reduced fabrication tolerances. In this configuration, the optic fiber is urged in the direction of the offset, to form a micro channel 125, and contacts the inside surface of the square capillary bore 123 at two circumferential regions. It can be appreciated that the region between the optic fiber 13 and the inside surface of the square capillary bore 123, which has been exaggerated for clarity of illustration, contains the epoxy 41.

Figure 13:
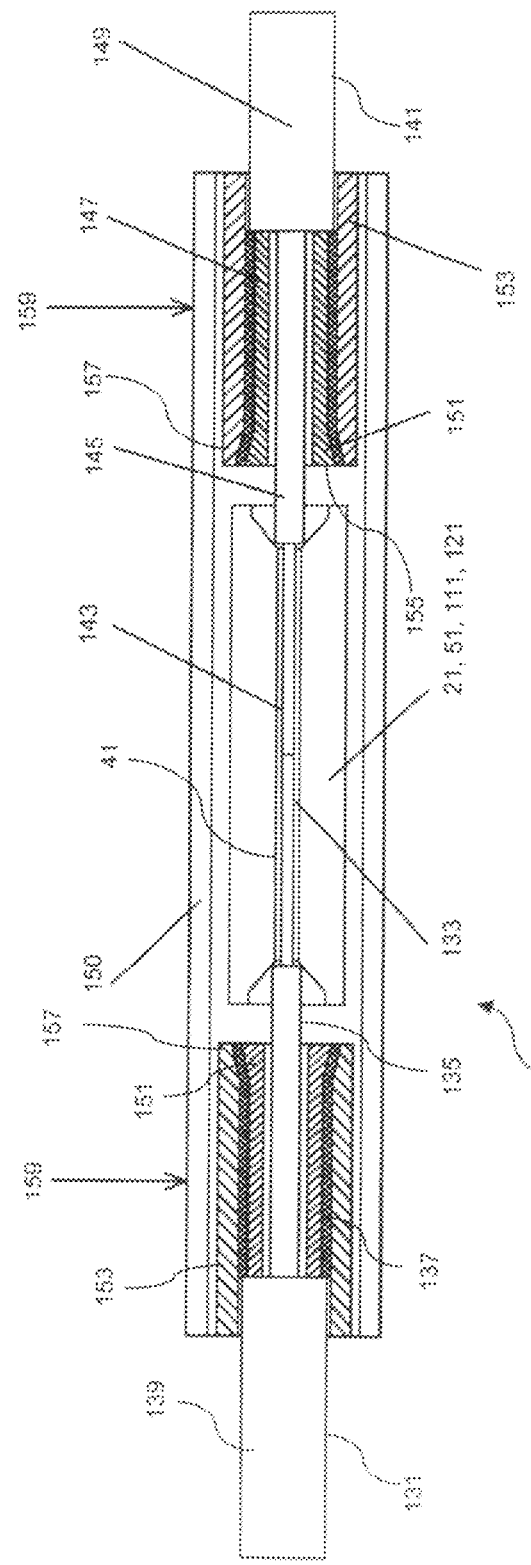
FIG. 13 is an alternative embodiment of the mechanical splice of FIG. 1 showing a metal tube enclosing the ferrule.

FIG. 13 shown an exemplary embodiment of a mechanical splice 140 for joining jacketed optic fiber cable, such as a first optic cable 131 and a second optic cable 141. The mechanical splice 140 comprises a protective metal tube 150 as an environmental enclosure for the ferrule, here shown as the ferrule 21, although it should be understood that any of the ferrule 51, the ferrule 111, and the ferrule 121, or any other suitable ferrule, can be used as well. The mechanical splice 140 further functions to withstand a tensile force that may be applied to either or both the first optic cable 131 and the second optic cable 141 during laying, pulling, or other installation procedures, for example.

As typically configured in the present state of the art, the first optic cable 131 may comprise an optic fiber 133, a resin buffer layer 135, a flexible fibrous polymer 137, such as Kevlar®, and an outer jacket layer 139, such as a plastic. The second optic cable 141 may similarly comprise an optic fiber 143, a resin buffer layer 145, a flexible fibrous polymer 147, and an outer jacket layer 149. The resin buffer layer 135 and the resin buffer layer 145 are removed from the portions of the optic fiber 133 and the optic fiber 143, respectively, to allow for insertion into the ferrule 21, or another ferrule that may be used. The epoxy 41 secures the outer surface of the optic fiber 133 and the outer surface of the optic fiber 143 to the ferrule 21, and the thin layer 43 of the epoxy 41 is retained between the optic fiber 133 and the optic fiber 143, as described above for the mechanical splice 20.

An internal sleeve 151 is inserted between the resin buffer layer 135 and the fibrous polymer 137, and another internal sleeve 151 is inserted between the resin buffer layer 145 and the flexible fibrous polymer 147. An outer sleeve 153 is positioned over the fibrous polymer 137 the first optic cable 131 such that a conical opening 157 in the outer sleeve 153 encloses a flared end 155 of the internal sleeve 151. A portion of the fibrous polymer 137 is thus retained between the flared end of the internal sleeve 151 and the conical opening of the outer sleeve 153. Similarly, another outer sleeve 153 is positioned over the fibrous polymer 147 in the second optic cable 141 such that the conical opening 157 in the other outer sleeve 153 encloses the flared end 155 of the other internal sleeve 151 to retain a portion of the fibrous polymer 147.

A crimp 159 is formed in one end of the metal tube 150 at the outer sleeve 153, and another crimp 159 is formed in another end of the metal tube 150 at the other outer sleeve 153, to secure the metal tube 150 to the first optic cable 131 and to the second optic cable 141. It can be appreciated by one skilled in the relevant art that a tensile force applied to the first optic cable 131 is thus conveyed through the fibrous polymer 137 and through the metal tube 150 to the fibrous polymer 147, and thus transferred to the second optic cable 141 without stressing either the first optic fiber 133 or the second optic fiber 143. This configuration ensures that the first optic fiber 133 remains spliced to the second optic fiber 143 after laying, pulling, or other installation procedures have been performed on the first optic cable 131 and the second optic cable 141.

Figure 14:
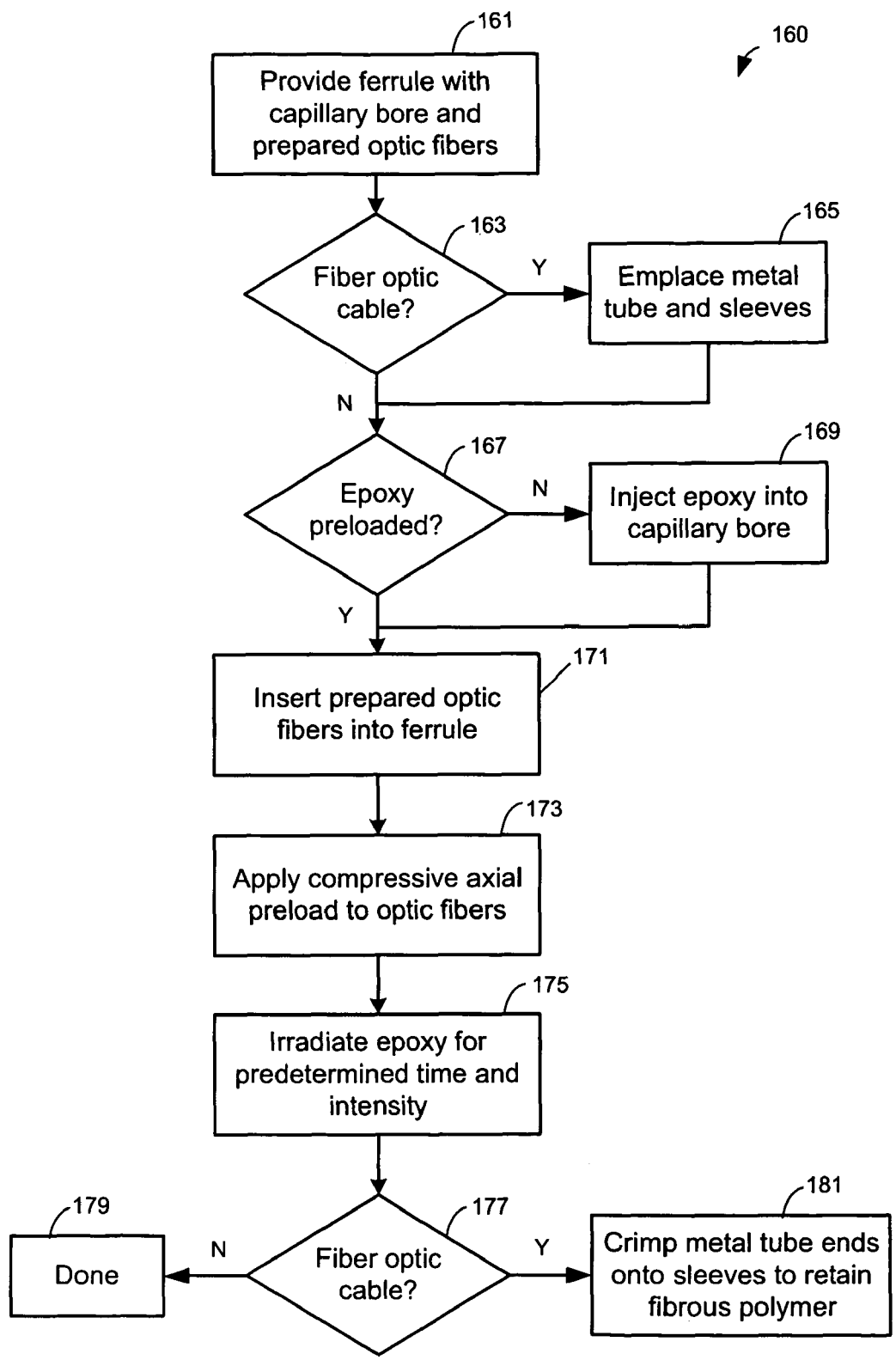
FIG. 14 is a flow diagram explaining a process for fabricating the mechanical splices of FIGS. 1 and 13.

The disclosed method of mechanical optic fiber splicing, using the mechanical splices 20 and 140 as examples, can be explained with additional reference to a flow diagram 160 in FIG. 14. A ferrule (i.e., the ferrule 21, the ferrule 51, the ferrule 111, the ferrule 121, or another suitably-configured ferrule) is obtained and the optic fibers are prepared by trimming and stripping as required, at step 161. If the splice to be made is an optic fiber cable mechanical splice, or is a fiber splice that may be subjected to harsh environments, at decision box 163, internal sleeves 151 and outer sleeves 153 are emplaced as described above to retain the fibrous polymer material, and the metal tube 150 may be placed over one of the optic fibers, in step 165. If, at decision box 163, the splice to be made is for loose-tube construction optic fibers, the metal tube may not be required and operation proceeds directly to decision box 167.

If the ferrule has been preloaded with epoxy, at decision box 167, the optic fibers are inserted into the ferrule, at step 171. Preferably, the preloaded ferrule has been stored by sealing in a light blocking and moisture blocking packaging to prevent premature curing of the epoxy. If the ferrule has not been preloaded with epoxy, at decision box 167, a predetermined quantity of epoxy may be injected into the ferrule, at step 169, and then the optic fibers may be inserted at opposite ends of the ferrule, as in step 171.

A predetermined compressive axial force is applied to the optic fibers after insertion to minimize the thickness of the layer of epoxy in the region between the fiber ends, at step 173. Preferably, the magnitude of the force is restrained to prevent possible damage to the optic fibers. This compressive force may be applied and maintained by the spring 69, shown in FIG. 4. The epoxy 41 in the ferrule is cured, at step 175, by irradiation with a predetermined intensity of ultraviolet light for a predetermined time.

If the mechanical splice is to be used in loose-tube construction, rather than in a jacketed fiber cable application, at decision block 177, the mechanical splice is complete, at step 179. If, on the other hand, the mechanical splice is to used with jacketed optic fiber cable, the metal tube 150 is positioned to enclose the ferrule and the ends of the metal tube 150 are crimped onto the outer sleeves 153, in step 181, each internal sleeve 151 and outer sleeve 153 retaining therebetween a flexible fibrous polymer portion of the corresponding optic fiber cable.

It is to be understood that the description herein is exemplary of the invention only and is intended to provide an overview for the understanding of the nature and character of the invention as it is defined by the claims. The accompanying drawings are included to provide a further understanding of various features and embodiments of the method and apparatus of the invention which, together with their description serve to explain the principles and operation of the invention. Thus, while the invention has been described with reference to particular embodiments, it will be understood that the present invention is by no means limited to the particular constructions and methods herein disclosed and/or shown in the drawings, but also comprises any modifications or equivalents within the scope of the claims.

What is claimed is:

1. A device for mechanically splicing a first optic fiber to a second optic fiber, said device comprising:
   a ferrule having a capillary bore, said capillary bore configured to enclose the first optic fiber at a first end of said ferrule and to enclose the second optic fiber at a second end of said ferrule; and
   epoxy disposed to secure the first optic fiber and the second fiber to a surface of said capillary bore;
   wherein said ferrule further includes at least one micro channel configured to enable excess said epoxy to flow out of said capillary bore;
   wherein said ferrule comprises an offset section;

wherein said offset section comprises an offset length of said ferrule displaced at an offset distance such that an end of the first optic fiber and an end of the second optic fiber are mutually aligned against said micro channel; and wherein said offset distance is approximately 10 to 200 µm.

2. A device for mechanically splicing a first optic fiber to a second optic fiber, said device comprising:

a ferrule having a capillary bore, said capillary bore configured to enclose the first optic fiber at a first end of said ferrule and to enclose the second optic fiber at a second end of said ferrule;

a metal tube enclosing said ferrule;

an internal sleeve disposed under a fibrous polymer layer enclosing the first optic fiber and between the fibrous polymer layer and the first optic fiber;

an outer sleeve disposed over the fibrous polymer layer; and epoxy disposed to secure the first optic fiber and the second fiber to a surface of said capillary bore;

wherein said ferrule further includes at least one micro channel configured to enable excess said epoxy to flow out of said capillary bore; and wherein said outer sleeve has a conical opening; said conical opening enclosing a flared end of said internal sleeve.

3. The device of claim 2 wherein a portion of said fibrous polymer layer is retained between said flared end of said internal sleeve and said conical opening of said outer sleeve; said flared end of said internal sleeve and said conical opening of said outer sleeve constituting a retaining device.

* * * * *